Aug. 20, 1957  M. E. WALBERG  2,803,085
DUSTING MECHANISM
Filed Oct. 26, 1955

Inventor
Maynard E. Walberg
by Donald C. McGaughey
Attorney

United States Patent Office 2,803,085
Patented Aug. 20, 1957

2,803,085

DUSTING MECHANISM

Maynard E. Walberg, West Salem, Wis., assignor to Allis-Chalmers Manufacturing Company, Milwaukee, Wis.

Application October 26, 1955, Serial No. 542,834

13 Claims. (Cl. 43—148)

This invention relates to dusting equipment and more particularly to the type dispensing insecticides and the like in the form of a fine, completely atomized and accurately regulated powder.

Dusting has always had a definite advantage over spraying in that equivalent results could be obtained using 20 to 40 lbs. of dust as compared to 1000 to 2500 lbs. of spray liquid. However, unreliable feed rate control of dust has been a limiting disadvantage of commercial dusters of heretofore known construction.

The common commercial machines have employed various types of feed agitators operating over and near a single or multiple air chamber with control depending on an adjustable or variable size opening for metering the dust into the air stream. The peripheral speeds of the agitators utilized in this type of duster have ranged from 15 to 6500 R. P. M. In dusters of this type the feed rate is affected by both depth of dust in the hopper and changing dust conditions resulting from agitation and vibration. High speed agitators may produce an irregular feed rate due to variations of the amount or head of dust in the hopper. On the other hand, machines with low speed agitators may be less sensitive to variations of the dust supply in the hopper, but they are affected more readily by variable dust conditions and frequently have a tendency to bridge with some types of dust. Therefore, with high or low speed agitation it has previously been difficult to obtain a constant feed rate by metering the solid dust through an adjustable orifice into the air stream.

The numerous kinds of dust materials used are of widely varying physical characteristics which affect duster performance. In the commonly used dusts the densities range from 9 to 96 lbs. per cubic foot. Variations in particle size range from 1.7 to 30.5 microns. The total range in particle size of diluents varies to a much greater extent. Due to the difficulties in obtaining a satisfactory feed rate of dust having the varied physical characteristics described above, it has previously been necessary to employ the diluent in large quantities to obtain the desired distribution of the active material. Frequently, only 1 percent of this type of diluted dust preparation is active. It is obvious that these highly diluted dust preparations, in a lesser degree, revert back to the disadvantage of the liquid type spray insecticides which require large amounts of a water diluent to distribute the insecticide in the desirable quantity.

The use of large quantities of diluent in a dust preparation is undesirable as the increased volume of dust requires large hoppers and more frequent refilling. In addition the particle size of diluents is frequently larger and more abrasive than that of the dust which results in difficulty with fractionation (mechanical separation of the active insecticidal and diluent) and also increased wear on the duster parts. From the practical standpoint the added cost and transportation of the diluent is undesirable. A further undesirable, practical consequence is an accumulation of inactive diluent material on the leaves of the plants which may result in a retarding of photosynthesis and plant growth.

Generally, it is an object of the invention to provide an improved dusting machine which avoids the shortcomings outlined above and which uniformly distributes the dust to the air stream.

Another object of this invention is to provide an improved dust feeding mechanism which provides for uniform dust distribution to the air stream regardless of the head or amount of dust in the hopper.

Another object of the invention is to provide an improved dust feeding mechanism which provides for uniform dust distribution regardless of the varied physical properties of the dust to be distributed.

A further object of this invention is to provide an improved dust feeding mechanism in which highly concentrated dust compounds can be uniformly distributed in the desired density without additionally adding a large amount of diluent thereto.

A still further object of this invention is to provide an improved dusting mechanism of the hereinabove outlined character in which the feed rate control of the dust may be accurately regulated in a simple and fully satisfactory manner.

The foregoing and other objects and advantages are attained by the present invention, various novel features of which will become apparent from the description herein and accompanying drawings disclosing a preferred embodiment of the invention, and as will be set forth in the appended claims.

Referring to the drawing:

Fig. 1 is a plan view of a crop dusting mechanism with parts broken away and shown in section;

Fig. 2 is a sectional view taken along the line II—II of Fig. 1; and

Fig. 3 is an elevational view of a baffle structure incorporated in the crop dusting mechanism shown in Figs. 1 and 2, the view of Fig. 3 being taken along the line III—III of Fig. 1.

Referring to Figs. 1 and 2, the dusting machine includes a blower housing generally designated by the reference figure 1. The housing consists of a pair of generally circular concave half castings 2 and 3 which are rigidly secured together as by bolting to form a blower chamber. Centrally located in the half casting 2 is an annular opening 12 which is surrounded by a tubular flange 13 having a series of air inlet openings 14 which provide an air intake source for the blower when in operation. The main outlet opening or discharge port 4 (Fig. 2) is tangentially located at a high pressure side of the blower housing 1. A distributor duct 6 is slidably received over port 4 and is secured thereon by a suitable strap clamp 7. It will be understood that duct 6 is adapted to receive any suitable type dust distributing head (not shown) in a conventional manner.

Tangentially located in half casting 3 is an auxiliary air outlet opening 9 which is spaced adjacent the main discharge port 4 at the high pressure side of the blower. The casting 3 is threaded at the outlet opening 9 and is adapted to receive an auxiliary conduit 11 which will be more fully described hereinbelow. A leaf valve 16 is provided in half casting 3 adjacent air outlet opening 9 to afford means for controlling the amount of air which passes into the auxiliary conduit 11. The valve 16 is rigidly secured to a shaft 17 which is pivotally mounted in half casting 3 adjacent air outlet opening 9. A control lever 18 on shaft 17 selectively controls valve 16 and the amount of air passing through auxiliary conduit 11.

Means for impelling a current of air is provided by an impeller assembly 25 having a shaft 21 rotatably mounted in the center of half casting 3 (Fig. 1) by means of suitable antifriction bearings (not shown). The outer end of impeller shaft 21 fixedly mounts a sheave 22 which may be driven by any suitable power source such as a conventionally splined tractor power take-off shaft 23, best shown in Fig. 2. A driving sheave 24 is mounted on power take-off shaft 23 in alignment with sheave 22 and a V-belt 26 is conventionally trained about the sheaves 22 and 24 to drive the impeller shaft 21. The inner end of impeller shaft 21 terminates inside of the blower chamber and short of the annular opening 12 in casing 2. An air impeller 27 is provided in the blower chamber on the inner end of shaft 21, and upon rotation thereof will indraft air through openings 14 and expel high pressure air from discharge port 4 and auxiliary conduit 11. The impeller construction includes a hub portion 32 fixedly mounting a series of identical radially extending support arms 29. Four paddle type air propelling elements 28 of identical construction are formed integral with support arms 29 and extend radially therefrom terminating short of the walls of the blower chamber. The hub portion 32 has a bore of a diameter adapted to receive impeller shaft 21 and is nonrotatably secured thereon by a key (not shown) and nut 33.

A dust hopper (Fig. 2), designated generally by the reference character 34, is provided with an attaching bracket 36 which projects tangentially therefrom. The hopper is rigidly secured to distributing duct 6 by a strap clamp 37 (Fig. 1) which surrounds duct 6 and the projecting portion of bracket 36. Tightening nut and bolt 38 compresses strap 37 and rigidly secures the bracket 36 and associated dust hopper 34 to duct 6. The dust hopper 34 is a hollow cylindrical element formed by a peripheral wall 41 and a generally circular bottom wall 42. The top of the dust hopper 34 is closed by a cover element (not shown) suitably secured thereon which is provided with a conventional gasket element to provide a substantially air tight connection with the top portion of peripheral wall 41. The peripheral wall 41 of the dust hopper 34 is provided with a tangentially positioned air admission opening 43 adjacent to bottom wall 42. The bottom wall 42 is provided with a centrally located discharge opening 44. An elongated sleeve element 46 (Fig. 2) passes through discharge opening 44 and projects transversely from both sides of bottom wall 42.

The interior of the dust hopper (as best shown in Fig. 2) is divided into two general areas, i. e., an upper dust storage chamber 59 and a lower dust pickup or air chamber 57, by a hollow baffle member 47 of generally cone shaped configuration which is placed therein with its convex top pointing upward. The baffle 47 may be formed of any suitable material such as sheet metal. A spaced series of four identical elongated apertures 48, 49, 50, 51 are provided about the lower periphery 56 of the baffle 47 as by stamping. The four peninsular parts or legs (Fig. 3) 52 through 55 which remain, serve to position and support the baffle 47 in the dust hopper. In this installed position the leg portions are positioned in contact with the point of intersection of bottom wall 42 and peripheral wall 41. When so positioned the leg portions brace baffle 47 and prevent movement relative to hopper 34. It will be appreciated that when so installed the baffle member 47 is spaced from the bottom of the dust hopper and provides a domed topped air chamber 57 about the air admission and discharge openings 43 and 44. It will be noted that air admission opening 43 is located in the registry with the outlet 9 of blower 1. The auxiliary conduit 11 which projects from outlet 9 extends through air admission opening 43 and underlies the edge 60 of aperture 50. An indent 58 is provided in the edge 60 to accommodate the discharge end of conduit 11. The end of auxiliary conduit 11 which underlies edge 60 is mitered as shown in Fig. 1 so as not to substantially disturb the circular configuration of the domed topped air chamber, defined by the baffle member 47. The dust, when placed in hopper 21, will spill down about baffle 47, the convex shape of the baffle aiding in feeding the material to the openings 48 through 51 in the baffle and to help prevent bridging and clogging. It will be realized that a portion of the dust will spill into the air chamber 57 through the apertures 48 through 51 and form a ring of dust about the base of the baffle where it is available for pickup by air entering the chamber 57.

A return duct 61 (Fig. 1) is slidably received over sleeve 46 and fixedly secured thereto by a suitable strap clamp 62. The return duct 61 communicates with the tubular air inlet flange 13 on blower casting 2 to complete the air circuit, that is, air travels from the blower to the dust pickup chamber 57 and back to the blower. A slidable sleeve 63 surrounds duct 61 and tube flange 13. Sleeve 63 is provided with a series of circumferentially spaced slots 64 which register with bolt receiving apertures in duct 61 and threaded bolt receiving holes in tubular flange 13. Cap screws 66 are passed through slots 64 and apertures in duct 61 and then threaded into the receiving holes in tubular flange 13 to secure the duct 61, flange 13 and sleeve member 63 in position. By releasing cap screws 66 the sleeve 63 may be slid longitudinally of duct 61 to open or close the inlet openings 14 as desired. The desired adjustment may be maintained by simply tightening cap screws 66.

The duster operates in the following manner. Activation of power take-off shaft 23 serves to drive the air impeller 27. This immediately sets up a passage of high pressure air through the main discharge port 4 and also a passage of high pressure air through the auxiliary conduit 11. The dust initially placed in the hopper 34 will spill through the baffle apertures 48, 49, 50, 51 and to some degree accumulate in a ring about the edge of the air chamber 57. The air which passes through auxiliary conduit 11 enters the air chamber at a tangent and is deflected by the baffle 47 and the exposed dust about the periphery of the air chamber to create a cyclonic air movement or turbulence in the direction of arrow A in Fig. 1. The cyclonic action of the air causes some of the dust in the dust ring in the air chamber 57 to be picked up and carried into the discharge opening and return duct 61. It will be realized that the ring of dust above referred to remains during operation as new dust is constantly metering into the air chamber to replace that picked up by the air. It will be noted that return duct sleeve element 46 projects into the air chamber 57 to an extent equal to the diameter of auxiliary conduit 11. This prevents the air which enters the chamber from passing directly into the air return duct 61. As the return duct 61 is connected to the low pressure side of blower 1 a partial vacuum exists in the return duct. Elevation of the return duct intake as above described places the point of intake area at a relatively high point in the cone. The air enters the chamber 57 at a point below the edge of sleeve 46 and as a consequence thereof is forced to rise somewhat prior to exit. This rising causes a slight delay which enables the air to cycle about the air chamber several more times and thus more thoroughly pickup and mix the dust and air prior to its exit from the air chamber through duct 61. It will be understood that the low pressure or partial vacuum causes the highly concentrated dust laden air to be recirculated into the blower through the annular opening 12. As the recirculated highly concentrated dust laden air passes the air inlet openings 14 in tubular air inlet flange 13, an amount of outside air is admixed therewith to dilute it a predetermined amount. This diluted dust laden air is then discharged through port 4 while a small portion of diluted dust laden air is again bled off through auxiliary conduit 11 to pass through the dust pickup chamber 57 to repeat the cycle.

It will be readily apparent that the duster affords a simple yet effective method of controlling the density or concentration of dust which is discharged. The duster incorporates two air control mechanisms; one being the leaf valve assembly 16 which is used to selectively vary the supply of air to the air chamber where dust pickup occurs; and the other being the air inlet sleeve 63 which controls the amount of air admixed to the highly concentrated dust which has left the dust pickup chamber 57. To facilitate use of leaf valve 16 the half blower casting 3 is provided with index markings 67 for calibration and exact replication of a desired setting. The selective adjustment of valve 16 will determined the amount of diluent dust laden air which will be permitted to recirculate to and pickup dust in the air chamber 57. The leaf valve 16 affords the primary control of the amount of dust in the exhausted air. It is possible to achieve efficient dust pickup even when a very small amount of air is let past the leaf valve 16 to recirculate through the chamber 57. The air inlet control sleeve 63 is provided to compensate for the pressure drop which may occur when recirculating only a small amount of air through the leaf valve 16. It also may be necessary, under certain conditions and types of dust, to increase the suction. This is accomplished by moving the sleeve 63 to the left as shown in Figs. 1 and 2 to restrict the amount of air passing through the inlet openings 14.

Under most operating conditions the adjustment of the above described leaf valve 16 will afford the desired density control of the dust concentration in the air. However, with the use of some dust preparations it may be desirable to vary the size of the apertures 48 through 51 in baffle 47 through which the dust passes to be exposed to the air in the dust pickup chamber 57. This may be accomplished by providing several baffle members each having different size apertures 48 through 51. Replacement of one cone having different size apertures is a simple matter as the operator need only to lift out the existing baffle and set in the replacement.

These factors (i. e., fresh air inlet and dust hopper air control and variable size dust exposure area) make possible a full range of density control. In addition the amount or head of dust in the hopper has no effect on the feed rate until reduced to the point where it no longer covers the apertures in baffle 47. This is due to the fact that only a predetermined amount of dust is exposed at one time to the air chamber by the apertures 48 through 51. The existence of more or less pressure on the dust at the apertures 48 through 51 will not and cannot cause a more rapid pickup of the dust by the air as only a given amount of dust is exposed at one time.

It is to be understood that it is not desired to limit the invention to the particular features and details described hereinabove, and that the invention is to be considered as including such other forms and modifications as are fairly embraced by the scope of the appended claims.

It is claimed and desired to secure by Letters Patent:

1. A dusting machine comprising a dust hopper having air admission and discharge openings, a baffle member positioned in said dust hopper and coacting therewith to provide an air chamber about said air admission and discharge openings, said baffle member having apertures therethrough exposing an area of dust in said hopper to said air chamber, and means impelling a current of air through said air admission opening into said air chamber to pick up dust exposed to said air chamber, the dust laden air being exhausted through said discharge opening.

2. A dusting machine comprising a dust hopper including a bottom wall having an air discharge opening therethrough, and a peripheral wall having an air admission opening therethrough adjacent said bottom wall, a baffle member positioned in said dust hopper and coacting therewith to provide an air chamber about said air admission and discharge openings, said baffle member having apertures therethrough exposing an area of dust in said hopper to said air chamber, and means impelling a current of air through said air admission opening in said dust hopper.

3. A dusting machine comprising a dust hopper including a bottom wall having an air discharge opening therethrough and a peripheral wall having a tangentially located air admission opening adjacent said bottom wall, a baffle member positioned in said dust hopper in spaced overlying relation to said bottom wall and coacting therewith to provide an air chamber about said air admission and discharge openings, said baffle member having apertures therethrough exposing an area of dust in said hopper to said air stream chamber, and a blower having an air inlet and an air outlet aperture, the latter positioned in air delivering relation to said air admission opening in said dust hopper.

4. A dusting machine comprising a dust hopper including a bottom wall having an air discharge opening therethrough and a peripheral wall having an air admission opening therethrough adjacent said bottom wall, a concave baffle member positioned in said dust hopper in spaced overlying relation to said bottom wall so as to provide a domed air chamber about said air admission and discharge openings, said baffle member having apertures therethrough exposing an area of dust in said hopper to said air chamber, and a blower having an air inlet and an air outlet aperture, the latter positioned in air delivering relation to said air admission opening in said dust hopper.

5. A dusting machine comprising a dust hopper including a bottom wall having a discharge opening therethrough, and a peripheral wall having an air admission opening therethrough adjacent the bottom wall thereof, a concave baffle member positioned within said dust hopper with said concave surface in spaced overlying relation to said bottom wall and coacting therewith to provide a domed air chamber about said air admission and discharge openings, said baffle member having apertures therethrough exposing an area of dust in said hopper to said air stream from said admission opening, a blower having an air inlet and an air outlet aperture, the latter positioned in air delivering relation to said air admission opening on said dust hopper; and means on said blower for selectively varying the amount of air passing into said air chamber.

6. A dusting machine comprising a dust hopper including a bottom wall having a discharge opening therethrough, and a peripheral wall having a tangentially located air admission opening adjacent said bottom wall; a hollow cone shaped baffle member positioned within a lower portion of said hopper to provide a domed air chamber over said air admission and discharge openings, said cone shaped baffle member having apertures therethrough exposing an area of dust in said hopper to said air chamber; and a blower having an air inlet and an air outlet aperture, the latter positioned in air delivering relation to said tangentially positioned air admission opening so that air passing into said air chamber is deflected by said cone shaped baffle to thereby create a cyclonic air turbulence in said air chamber which picks up the dust exposed by said apertures.

7. A dusting machine comprising a dust hopper having air admission and discharge openings; a baffle member positioned in said dust hopper to provide an air chamber about said air admission and discharge openings, said baffle member having apertures therethrough exposing an area of dust in said hopper to said air chamber; a blower having a main discharge port, an air inlet and an air outlet aperture, the latter positioned in air delivering relation to said air admission opening; and a return duct communicating with said hopper discharge opening and said air inlet opening of said blower, said return duct forming an air circuit between said air chamber and main blower inlet to recirculate dust laden air to said blower for discharge therefrom.

8. A dusting machine comprising a dust hopper including a bottom wall having a discharge opening therethrough and a peripheral wall having an air admission opening adjacent said bottom wall; a baffle member positioned in said dust hopper to provide an air chamber about said air admission and discharge openings, said baffle member having apertures therethrough exposing an area of dust in said hopper to said air chamber; a blower having a main discharge port, an air inlet aperture, and an air outlet aperture, the latter positioned in air delivering relation to said air admission opening; and a return duct communicating with said hopper discharge opening and said air inlet opening of said blower, said return duct forming an air circuit between said air chamber and main blower inlet to recirculate dust laden air to said blower for discharge therefrom.

9. A dusting machine comprising a dust hopper including a bottom wall having a discharge opening therethrough and a peripheral wall having an air admission opening adjacent said bottom wall; a baffle member positioned in said dust hopper to provide an air chamber about said air admission and discharge openings, said baffle member having apertures therethrough exposing an area of dust in said hopper to said air chamber; a blower having a main discharge port, an air inlet aperture, and an air outlet perture, the latter positioned in air delivering relation to said air admission opening; a return duct communicating with said hopper discharge opening and said air inlet opening of said blower, said return duct forming an air circuit between said air chamber and main blower inlet to recirculate dust laden air to said blower, and means for admixing a selected amount of air to said recirculated dust laden air prior to its discharge from said blower.

10. A dusting machine comprising a dust hopper including a bottom wall having a discharge opening and a peripheral wall having a tangentially located air admission opening adjacent said bottom wall; a baffle member positioned in said dust hopper in spaced overlying relation to said bottom wall, to provide an air chamber about said air admission and discharge openings, said baffle member having apertures therethrough exposing an area of dust in said hopper to said air chamber; a blower having a main discharge port, an air inlet aperture, and an air outlet aperture, the latter positioned in air delivering relation to said air admission opening; and a return duct communicating with said hopper discharge opening and said air inlet opening of said blower, said return duct forming a closed air circuit between said air chamber and main blower inlet to recirculate dust laden air to said blower for discharge therefrom.

11. A dusting machine comprising a dust hopper including a bottom wall having a discharge opening and a peripheral wall having a tangentially located air admission opening adjacent said bottom wall; a concave baffle member positioned in said dust hopper in spaced overlying relation to said bottom wall to provide a domed air chamber about said air admission and discharge openings, said baffle member having apertures therethrough exposing an area of dust in said hopper to said air chamber; a blower having a main discharge port, an air inlet aperture, and an air outlet aperture, the latter positioned in air delivering relation to said air admission opening; and a return duct communicating with said hopper discharge opening and said air inlet aperture of said blower, said return duct forming a closed air circuit between said air chamber and main blower inlet to recirculate dust laden air to said blower for discharge therefrom.

12. A dusting machine comprising a dust hopper including a bottom wall having a discharge opening and a peripheral wall having a tangentially located air admission opening adjacent said bottom wall; a hollow cone shaped baffle member positioned within a lower portion of said dust hopper to provide a domed air chamber about said air admission and discharge openings, said baffle member having apertures therethrough exposing an area of dust in said hopper to said air chamber; a blower having a main discharge port, an air inlet aperture, and an air outlet aperture, the latter positioned in air delivering relation to said air admission opening so that air passing into said air chamber is deflected by said baffle member to thereby create a cyclonic air turbulence in said air chamber which picks up dust exposed by said apertures; and a return duct communicating with said hopper discharge opening and said air inlet aperture of said blower to recirculate dust laden air to said blower for discharge therefrom.

13. A dusting machine comprising a dust hopper including a bottom wall having a discharge opening and a peripheral wall having a tangentially located air admission opening adjacent said bottom wall; a hollow cone shaped baffle member positioned within a lower portion of said dust hopper to provide a domed air chamber about said air admission and discharge openings, said baffle member having apertures therethrough exposing an area of dust in said hopper to said air chamber; a blower having a main discharge port, an air inlet aperture, and an air outlet aperture, the latter positioned in air delivering relation to said air admission opening means on said blower for selectively varying the amount of air passing into said air chamber; a return duct communicating with said hopper discharge opening and said air inlet aperture of said blower, said duct recirculating dust laden air to said blower; and means cooperative with said air inlet for admixing a selected amount of air to said recirculated dust laden air prior to its discharge from said blower.

References Cited in the file of this patent

UNITED STATES PATENTS

| | | |
|---|---|---|
| 1,561,039 | Walker | Nov. 10, 1925 |
| 2,063,131 | Siems | Dec. 8, 1936 |
| 2,556,561 | Hoelscher | Sept. 23, 1941 |

FOREIGN PATENTS

| | | |
|---|---|---|
| 841,658 | Germany | June 19, 1952 |

UNITED STATES PATENT OFFICE

CERTIFICATE OF CORRECTION

Patent No. 2,803,085                                                August 20, 1957

Maynard E. Walberg

It is hereby certified that error appears in the printed specification of the above numbered patent requiring correction and that the said Letters Patent should read as corrected below.

Column 6, line 63, after "inlet" insert --aperture--; column 7, line 21, for "perture" read --aperture--.

Signed and sealed this 12th day of November 1957.

(SEAL)
Attest:
KARL H. AXLINE

Attesting Officer

ROBERT C. WATSON
Commissioner of Patents